March 17, 1925.
A. C. DE NISSON
1,529,877
COMBINED PISTON AND PISTON RING
Filed March 25, 1922
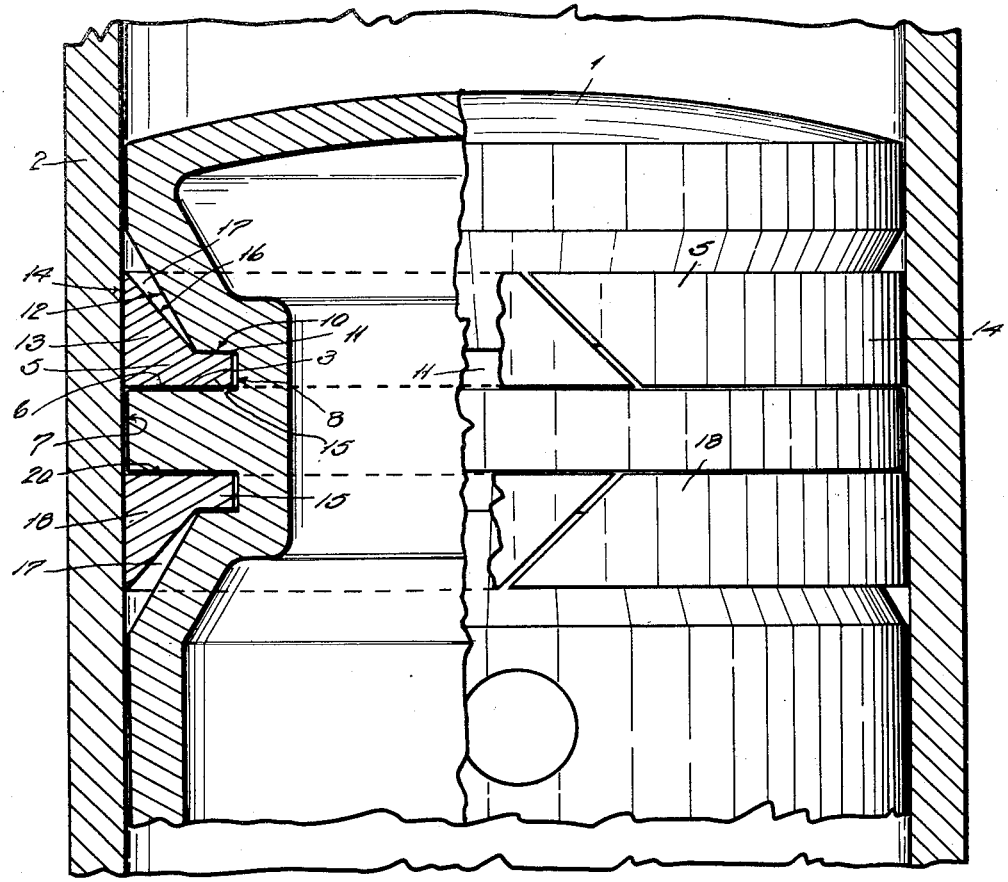
INVENTOR
Alfred C. DeNisson
BY
Frank Warren
ATTORNEY Patented Mar. 1, 1925.

1,529,877

UNITED STATES PATENT OFFICE.

ALFRED C. DE NISSON, OF SEATTLE, WASHINGTON.

COMBINED PISTON AND PISTON RING.

Application filed March 25, 1922. Serial No. 546,708.

*To all whom it may concern:*

Be it known that I, ALFRED C. DE NISSON, a citizen of the United States, residing at Seattle, in the county of King and State of Washington, have invented a certain new and useful Improvement in Combined Pistons and Piston Rings, of which the following is a specification.

My invention relates to improvements in combined pistons and piston rings, and particularly to improvements on that type of rings disclosed and described in my co-pending patent application, filed April 14, 1921, Serial No. 461,248, and the object of my invention is to provide a piston ring wherein the pressure present in the engine cylinder either from the compression of the gases residing in the cylinder or from the expansion of said gases through explosion will be directed on the rear surface of the piston ring and cause the ring to be expanded outwardly adjacent the cylinder wall and downwardly against the lower wall of the groove within the piston in response to the pressure within the cylinder.

With the above and other objects in view, which will appear as the description proceeds, my invention resides in the novel construction of a piston ring and piston the arrangement and adaptation of parts hereinafter described and claimed, it being understood that within the scope of what is claimed in the precise form of my invention shown can be made without departing from the spirit thereof.

I accomplish these objects by devices illustrated in the accompanying drawings which is a fragmentary view shown partly in cross-section and partly in side elevation of a piston, the seating rings therefor being shown in an operative position in an engine cylinder which is shown in cross-section.

Referring to the drawings throughout which like reference numerals indicate like parts, the numeral 1 designates a piston and 2 the cylinder wall of an internal combustion engine, which piston 1 is formed with an annular groove 3 adjacent the upper end thereof to receive a sealing ring 5, said groove comprises a lower horizontal face 6 extending inwardly for a considerable depth from the vertical peripheral wall 7 of the piston, a perpendicular rear wall 8, a relatively short horizontal wall 10, and an inclined face 12.

The sealing ring 5 is formed with an outer body 13 which is provided with a perpendicular face 14 adapted to engage the cylinder wall 2 and an inner flange 15, rectangular in cross-section, adapted to seat within said groove portion 11 and be retained therein in an operative manner. The ring body 13 is further provided with an inclined face 16 opposing the face 12 of the groove, which face 12 is disposed at a somewhat greater degree of angularity than the face 14 to afford an angular convergent recess 17 between the ring body 12 and the piston.

The pressure within the cylinder caused by an explosion of the gaseous charge will pass by the upper head of the piston and will enter the recess 17 striking upon the inclined face 16 thereby causing the perpendicular face 14 to engage the cylinder 2 and the lower horizontal face 6 thereby making a leak proof joint, while the pressure caused by the downward stroke of the piston, from the lower chamber of the cylinder will enter the recess 17 and the ring 18 to act upon the cylinder wall in the same manner as the upper ring.

The contact of the perpendicular face 14 with the cylinder wall 2, together with the lubricant between the wall and ring, ensures the exclusion of the pressure on the side of the ring opposing the distending effect of the pressure on face 16 thereby counteracting the expanding effect upon the ring of the pressure generated within the cylinder. A portion of the forces exerted upon the piston ring is exerted in a downward direction and will thus effect a more perfect seal of the lower ring face upon the horizontal face 6 of the groove.

While I have described my invention in connection with a single sealing ring only, obviously more than one ring may be used and in the drawing I have shown an additional ring 18 and groove 20 disposed in reverse relation to ring 5 and groove 3 but otherwise similar in construction, said ring 18 is especially designed to prevent undue leakage of lubricant into the explosion chamber and will be positively acted upon from the pressure below the piston on the suction stroke and upon the downward stroke caused by the explosion. The pressure affecting said lower ring will not be sufficient to withhold the passage of oil entirely from the wall of the cylinder there being sufficient lubricant supplied along the cylinder to properly lubricate the same.

What I claim is:

A ring of the class described comprising in combination with a piston having an annular ring groove adjacent its end formed with a horizontal lower face of relatively considerable depth extending into a rectangular portion of the groove at the rear thereof, and an upper outwardly inclined face extending from said rectangular groove portion upwardly at an acute angle relative to the longitudinal axis of the piston, and an expansible ring seated in said groove formed with a rectangular flange extending into said rear groove portion, a body having a vertical face bearing on the cylinder wall, said body having an inclined face opposing the inclined face of the groove and inclined at a greater angle to afford a convergent recess therebetween wherein the pressure in the cylinder is communicated and directed upon the ring to force said ring outwardly and downwardly.

In witness whereof, I hereunto subscribe my name this 20th day of March, A. D. 1922.

ALFRED C. DE NISSON.